UNITED STATES PATENT OFFICE.

LEOPOLD FALK, OF REVAL, RUSSIA.

PROCESS FOR THE MANUFACTURE OF WHITE LEAD.

999,637.     Specification of Letters Patent.     Patented Aug. 1, 1911.

No Drawing.     Application filed February 12, 1910. Serial No. 543,422.

*To all whom it may concern:*

Be it known that I, LEOPOLD FALK, Ph. D., a subject of the Czar of Russia, residing at Reval, Russia, have invented certain new and useful Improvements in Processes for the Manufacture of White Lead, of which the following is a specification.

My invention relates to the manufacture of white lead and consists in a process for the preparation of a definite basic lead carbonate compound, which possesses exceptional coating power, and the exact composition of which is given by the formula $$5PbCO_3 2Pb(OH)_2 PbO.$$

and which forms together with white lead of the formula $2PbCO_3 Pb(OH)_2$ the basis of the present chamber-processes for making white lead in Germany and England.

As is well known, lead carbonate possesses the property of combining readily with lead oxid from a solution of lead acetate, whereby as the applicant has discovered, that according to the temperature and the concentration of the lead acetate solution, compounds of a greater or lesser basic nature result. In the German Patent No. 42307 and U. S. Patent No. 417,434, a process is described whereby lead carbonate, obtained by precipitation from solutions of lead acetate or lead nitrate treated with sodium bicarbonate or with a mixture of sodium carbonate and sodium bicarbonate, is treated after previous washing, with a basic solution of lead acetate and the white lead obtained is separated from the acetate solution. The latter is again rendered basic by means of litharge, and the basic solution is treated with a further quantity of lead carbonate. In this manner unlimited quantities of white lead can be prepared from one and the same quantity of acetate. It has, however, been shown that this method can not only be simplified to a great extent, but will also be shortened and be capable of being carried into effect in one continuous operation, when neutral lead carbonate is treated with a small quantity of lead acetate (about 1% to 1.5% by weight of the carbonate), which neutral lead carbonate must not contain more than 20 to 25% of water, and then stirred with the calculated amount of litharge, whereby the lead acetate, as in the above described process, has merely the function of a vehicle for the $Pb(OH)_2$ group to the carbonate, according to the equation:

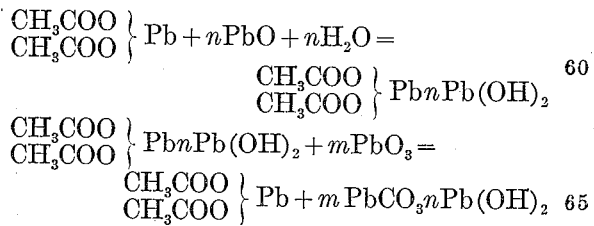

It is also shown, that in this manner when treated in the cold, a white lead having the formula $$5PbCO_3 2Pb(OH)_2 PbO$$

with 10.8% $CO_2$ is obtained, having exceedingly good covering power, which hitherto has never been prepared in the pure condition, while when treated by heat a white lead is split off which has the formula $$2PbCO_3 Pb(OH)_2$$

with 11.35% $CO_2$ and which corresponds to the white lead prepared by the chamber-process. The mass becomes solid during the introduction of the litharge, and has to be kept fluid by the constant addition of water. Any excess of litharge is ascertained by stirring a sample of the reaction mass with a neutral lead acetate solution, and then adding mercury chlorid to the filtered solution, whereby a corresponding precipitation indicates the excess of lead oxid. This can be made to disappear by adding fresh lead carbonate, and consequently it is possible to make the quantity of lead oxid corresponding to the amount in the equation react with the lead carbonate, and thus have an exactly theoretical equivalent. The principal consideration for the success of the reaction is that the starting material, namely, the lead carbonate, must be absolutely neutral; this being attained by treating the basic lead acetate solution for such a length of time with carbonic acid, until the solution contains free acetic acid, which is preferably carried out under pressure in precipitating or carbonating vessels. The corresponding precipitate is preferably only washed so long that it contains the required quantity of lead acetate, after which it is treated in the manner described above. For example 100 kg. neutral lead carbonate containing 10% water and 1% lead acetate is mixed with 40.5 kg. litharge in the cold, the result being that a white lead is obtained exactly corresponding with the formula $$5PbCO_3 2Pb(OH)_2 PbO.$$

The new process is distinguished from the process described in the specification of the German Patent 186972 not only in relation to the starting material, but also in the product obtained. According to that process the starting material used,—in so far as the carbonate comes into question—is a lead carbonate obtained by precipitation from a lead salt solution treated with sodium carbonate, the lead carbonate thus obtained is, as is well known, not a neutral salt, but in fact, a product having not even a definite chemical composition according to this process, but it is absolutely impossible to prepare compounds having the formula $$5PbCO_3 2Pb(OH) PbO$$

according to this process, as when the carbonate obtained in the manner described above is mixed with litharge in the cold there is absolutely no reaction, owing to the presence of sodium acetate or sodium nitrate, these being formed when solutions of lead salts are treated with sodium carbonate, and consequently the compound $$5PbCO_3 2Pb(OH)_2 PbO$$

cannot be obtained since it is only stable in a cold state. Likewise in the warm state, owing to the primary material not being a pure and uniform neutral lead carbonate owing to its method of preparation, the compounds resulting therefrom have no definite chemical composition, and possess a smaller degree of covering capacity. It must not be overlooked in this connection that the high basic compound $$5PbCO_3 2Pb(OH)_2 PbO$$

can only be obtained when absolutely neutral lead carbonate and no mixture of different lead carbonates is used, and that the contents of carbonic acid in a white lead is accepted as the measure of its quality, respectively of its covering capacity.

The advantages claimed by the present process are as follows: A white lead is assured having a perfectly definite composition and consequently perfectly definite properties; the neutral carbonate is obtained in a cheap and simple manner while the process of stirring the carbonate with the lead oxid only occupies some hours.

I claim:

1. The process herein described of making white lead, consisting in stirring neutral lead carbonate containing not more than 25% of water in the presence of a small quantity of lead acetate with an equivalent quantity of litharge.

2. The process herein described for the preparation of white lead consisting in leading carbonic acid or gases containing carbonic acid under pressure into a solution of basic lead acetate until neutral lead carbonate has formed, and then stirring this neutral lead carbonate thus obtained in the presence of a small quantity of lead acetate with an equivalent quantity of litharge.

3. The process herein described for the preparation of white lead consisting in leading carbonic acid or gases containing carbonic acid under pressure into a solution of basic lead acetate until neutral lead carbonate has formed, and then stirring the neutral lead carbonate thus obtained in the cold in the presence of a small quantity of lead acetate with such a quantity of litharge that a white lead of the formula $$5PbCO_3 2Pb(OH)_2 PbO$$

is obtained.

In testimony, that I claim the foregoing as my invention, I have signed my name in presence of two subscribing witnesses.

LEOPOLD FALK.

Witnesses:
ERICH MOISER,
ERNST KRUEK.

---

Copies of this patent may be obtained for five cents each, by addressing the "Commissioner of Patents, Washington, D. C."